United States Patent
Griewenka (10) Patent No.: US 9,512,875 B2
(45) Date of Patent: Dec. 6, 2016

(54) BEARING UNIT (71) Applicant: Johnson Controls Metals and Mechanisms GmbH & Co. KG, Solingen (DE)

(72) Inventor: Norbert Griewenka, Solingen (DE)

(73) Assignee: Johnson Controls Metals and Mechanisms GmbH & Co. KG, Solingen (DE)

( * ) Notice: Subject to any disclaimer, the term of this patent is extended or adjusted under 35 U.S.C. 154(b) by 51 days.

(21) Appl. No.: 14/410,673

(22) PCT Filed: May 10, 2013

(86) PCT No.: PCT/EP2013/059746
§ 371 (c)(1),
(2) Date: Dec. 23, 2014

(87) PCT Pub. No.: WO2014/000936
PCT Pub. Date: Jan. 3, 2014

(65) Prior Publication Data
US 2015/0337897 A1    Nov. 26, 2015

(30) Foreign Application Priority Data
Jun. 26, 2012 (DE) .................. 10 2012 105 575

(51) Int. Cl.
*F16C 23/10* (2006.01)
*F16C 23/02* (2006.01)

(52) U.S. Cl.
CPC ............ *F16C 23/10* (2013.01); *F16C 23/02* (2013.01)

(58) Field of Classification Search
CPC ..................................... F16C 23/10
See application file for complete search history.

(56) References Cited

U.S. PATENT DOCUMENTS

| 1,443,685 | A | * | 1/1923 | Huff | .......... | B62D 3/02 |
| | | | | | | 123/78 F |
| 1,571,557 | A | * | 2/1926 | Paul | .......... | F16C 23/10 |
| | | | | | | 384/255 |

(Continued)

FOREIGN PATENT DOCUMENTS

| DE | 8024841 U1 | 9/1979 |
| DE | 19947619 A1 | 10/1999 |

(Continued)

OTHER PUBLICATIONS

International Search Report for application No. PCT/EP2013/059746, dated Aug. 13, 2013.

*Primary Examiner* — Thomas R. Hannon
(74) *Attorney, Agent, or Firm* — The Dobrusin Law Firm, P.C.

(57) ABSTRACT

A bearing unit including an outer guide sleeve having an opening, as well as an inner receiving sleeve that is rotatably arranged inside the outer guide sleeve opening and that includes a recess. A rotational axis of the inner receiving sleeve in the outer guide sleeve and a central axis of the recess in the inner receiving sleeve are arranged at a distance from each another about an eccentricity. The bearing unit allows the position in which securing elements are mounted to be adapted in a simple and reproducible manner, and which is formed from just a few components so as to permit simple and cost-effective assembly. A device is provided between the outer guide sleeve and the inner receiving sleeve for the purpose of force and/or form-fittingly securing an adjusted receiving sleeve position relative to the guide sleeve.

11 Claims, 5 Drawing Sheets

(56) References Cited

U.S. PATENT DOCUMENTS

| | | | | |
|---|---|---|---|---|
| 4,252,059 A | * | 2/1981 | Simeth | B41F 13/28 |
| | | | | 101/144 |
| 6,662,681 B2 | * | 12/2003 | Crane | E02F 3/3613 |
| | | | | 248/200 |
| 7,980,152 B2 | * | 7/2011 | Arlt | B62D 3/12 |
| | | | | 384/255 |

FOREIGN PATENT DOCUMENTS

| | | |
|---|---|---|
| DE | 102010031724 A1 | 7/2010 |
| WO | 2012072446 A1 | 6/2012 |

\* cited by examiner

BEARING UNIT

The present invention relates to a bearing unit, with an outer guide sleeve, which has an opening and a rotatable inner receiving sleeve arranged in a rotatable manner inside fee opening of the outer guide sleeve having a recess to receive a securing means, whereby a rotational axis of the inner mounting sleeve in the outer guide sleeve and a central axis in the recess of the inner receiving sleeve to receive the securing means are arranged at a distance from each other by means of an eccentricity.

Bearing units of the type indicated above are known in many forms in the present state of the art and are used for the assembly of a very wide range of structural components. In this way, typically the outer guide sleeve is arranged on a first structural element while the second structural element which is to be mounted on the first structural element is secured by means of a securing means to the inner receiving sleeve.

With the assembly of complex mechanisms from a number of structural elements, because of structural tolerances an undesirable but at the same time unavoidable, play can result between the structural elements. This is undesirable, especially in the case of gear systems and other moving mechanisms, as it can produce increased wear, an inaccurate operation and an undesirable increase in the noise level.

With a bearing unit of the type described above, which comprises an eccentricity, this play can be eliminated once all the structural elements have been assemble by rotating the inner receiving sleeve in relation to the outer guide sleeve. After the final adjustment, the inner receiving sleeve and the outer guide sleeve must be secured in relation to each other in order to prevent any further unwanted displacement.

To this end, in most cases, additional securing means are provided between the inner receiving sleeve and the outer guide sleeve. In this case, the components are either permanently bonded together, i.e. by the irreversible joining of both sleeves, typically be means of an adhesive or by welding or soldering both parts, or they are joined by mechanical means in such a way that both sleeves are irreversibly joined together and no further displacement caused for example by a deformation of parts of the individual sleeves is possible. All of these methods have the drawback that if the parts are irreversibly joined together, further adjustments are possible if any further play should arise.

Furthermore, highly complex, reversible mechanisms are known in the state of the art, which can be used to join the sleeves together, but these have the essential drawback of being cost-intensive to manufacture and both time-consuming and complicated to use.

A further drawback of all bearing devices known to the state of the art lies in the fact that, during the adjustment the applied maximum torque must be very carefully monitored so as to ensure that the mechanism in which the play is adjusted by means of the adjustable bearing device is not damaged. The use of special and thereby costly tools is required and the use of such tools also complicates any adjustments.

The aim of the present invention is to propose a hearing unit that enables the position of the bearing of a securing means to be easily and reproducibly adapted and that comprises a limited number of structural elements so that it is both easy and economical to assemble.

This aim is achieved in accordance with the present invention by a device according to Claim 1. Advantageous further embodiments of the present invention are indicated in the subordinate claims.

The bearing unit according to the present invention comprises an outer guide sleeve having an opening and an inner receiving sleeve, which can be rotated inside the opening of the outer guide sleeve and which has a recess to receive a securing means. The axis of rotation of the inner receiving sleeve and a central axis of the recess in the inner receiving sleeve for receiving the securing means are arranged at a distance from each other about an eccentricity. Between the outer guide sleeve and the inner receiving sleeve there is additionally a device for the force and/or form fitting to secure an adjusted position of the receiving sleeve in relation to the guide sleeve in order to prevent any unwanted rotation of the inner receiving sleeve within the outer guide sleeve.

Because of the eccentricity of both rotational axes it is especially easy, by rotating the receiving sleeve in the guide sleeve, to vary the position of a securing means arranged in the recess of the of the receiving sleeve in relation to the guide sleeve. At the same time, the simple assembly of the bearing unit from two structural elements ensures that the manufacture and the assembly stages are both simple and cost-effective. On the basis of these advantages, it is—for example—especially simple to achieve the series production of a rack in relation to a pinion in a vehicle seat, and in particular a height adjustment system in a motor vehicle seat, and to arrange this precisely in a reproducible manner.

In principle, the outer guide sleeve and the inner receiving sleeve can be in any shape and be made of any material. Preferably the material has a high strength and a low weight, for example a light metal, aluminium, plastic or a composite material, whereby the overall weight of the bearing device can be kept advantageously to a minimum.

The outer guide sleeve and/or the inner receiving sleeve can be made out of a single piece or of a combination of other structural components, whereby the outer guide sleeve and/or the inner receiving sleeve are preferably in the form of a single component thus advantageously enabling the manufacturing and assembly stages to be cost-effective and simple.

It can also be envisaged that the outer guide sleeve does not only accommodate the inner receiving sleeve, but that it also carries out additional functions. In the same way, the inner receiving sleeve can also carry out a function additional to that of accommodating a securing means and being rotatable within the opening of the outer guide sleeve.

The outer guide sleeve comprises an opening, which is preferably essentially round, so that the inner receiving sleeve, which is arranged inside it, can rotate. It is especially preferable if the opening can be arranged orthogonally on at least one surface of the outer guide sleeve and even more preferable if it can be arranged orthogonally on two parallel surfaces of the outer guide sleeve so mat the opening is cylindrical in shape. Moreover, it is preferable if in this way the opening can penetrate the outer guide sleeve completely. In principle, the proportion of the diameter of the opening in relation to the thickness of the outer guide sleeve is immaterial, although preferably this proportion will be greater than 1 and more preferably greater than 2.

In at least one section of the outer surface, the inner receiving sleeve has a shape that matches that of the opening in the outer guide sleeve. Preferably this shape will be cylindrical, having a smaller radius than that of the opening in the outer guide sleeve, in such a way that it can be arranged in this opening. It is especially preferable if the cylindrical section can be essentially just as long as the opening in the outer guide sleeve is deep.

The inner receiving sleeve comprises a recess, which preferably passes completely through the inner receiving sleeve. The diameter of the recess of the inner receiving sleeve is preferably smaller than that of the cylindrical section. In principal, however, it can also be envisaged that the recess does not pass completely through the inner receiving sleeve and that the diameter of the recess is greater than that of the cylindrical section. Similarly, the diameters can be identical.

The rotational axis of the inner receiving sleeve is defined as the axis running through the central point of the opening in the outer guide sleeve and orthogonally. In relation to a face end of the opening, whereby the inner receiving sleeve is rotatable in the outer guide sleeve around the rotational axis. Preferably, the rotational axis runs along a normal line of an essentially circular surface area of the cylindrical section of the inner receiving sleeve and at the same time through the central face end.

The central axis of the recess in the inner receiving sleeve is defined as the axis that runs through the central point of the recess and along a normal line of the preferably essentially circular area of the recess.

At the same time, the rotational axis and the central axis ran in parallel to each other in parallel, whereby the two axes are at a distance from each other. The distance between the two axes is defined as the eccentricity of the two axes or of die inner receiving sleeve.

The eccentricity can be of any size, although it is preferred to be smaller than half the radius of die groove and especially preferred to be less than one quarter of the radius of the recess. In this way, the size of the eccentricity is decisive for the maximum adjustability of the securing means arranged inside the recess of the inner receiving sleeve in relation to the outer guide sleeve, or a structural element on which this is arranged.

With regard to the securing means, this can be any device that is suitable for securing, such as for example a nut, a pin, a split pin, an axle, a rack, a screw or a bolt.

The device for the force and/or form-locking means of securing an adjusted position of the inner receiving sleeve in relation to rite outer guide sleeve can be in any form. In this respect, both self-locking and also controlled or switched systems can be envisaged. However, the preferred solution is a simple device comprising only a few component parts, while the very preferred solution is for the device to be in the form of a part of the outer guide sleeve and/or the inner receiving sleeve, which ensures that the parts can be economically produced and assembled.

According to an advantageous further development of the present invention, the device for the force and/or form-locking for securing the position of a locking device is a device which locks the inner receiving sleeve to the outer guide sleeve and is preferably arranged on the contact surfaces of the inner receiving sleeve and/or the outer guide sleeve in the vicinity of the opening.

In a particularly advantageous embodiment of the present invention, the locking device is formed by a toothed arrangement of the contact surface of the Inner receiving sleeve and/or the outer guide sleeve, whereby a self-locking effect of the locking device is easily achieved. A particularly preferred solution would be for foe locking mechanism to be designed in such a way that the rotational movement is facilitated in a preferred direction. This is achieved by providing a rounded toothing system, whereby for the formation of the rounded toothing, the radius of the rounding of one of the toothings along the line of the direction of rotation is significantly greater than in the other direction of rotation. It would also be possible to arrange a channel toothing on at least one of the toothed structural elements.

According to a further development of the present invention, the toothing is formed from an elastic material, which is elastically deformed during the rotation of the inner receiving sleeve in relation to the outer guide sleeve, whereby as an especially preferred feature a particular moment is required in order to overcome the tooth engagement through a friction moment between the inner receiving sleeve and the outer guide sleeve during operation. In this way, during the operation of the bearing unit, a self-locking of the adjustability of the inner receiving sleeve in the outer guide sleeve is assured, while the alignment of the inner receiving sleeve in the outer guide sleeve can be earned out especially easily and extremely efficiently.

According to a further development of the present invention, the inner receiving sleeve and/or the outer guide sleeve sue at least partially, but preferably completely, made of plastic, whereby it is especially preferred for this plastic to be a high strength elastic plastic, such as for example, polyethylene, polypropylene or polyacetate.

According to a further advantageous further development of the present invention, the plastic material comprising the inner receiving sleeve and/or the outer guide sleeve additionally contains a fibre reinforcement.

According to a further advantageous further development of the present invention, die recess in the inner receiving sleeve and/or the opening in the outer guide sleeve are essentially round, whereby it is especially preferable if the diameter of the recess corresponds to the diameter of the securing means to be arranged therein, so that the securing means can be arranged and secured in a particularly easy manner within the recess.

It would also be preferable for the inner receiving sleeve arranged in the opening of the outer guide sleeve to project beyond the opening of the outer guide sleeve on one or both ends.

According to a preferred further development of the present invention, the inner receiving sleeve has a flange, which preferably, when the inner receiving sleeve is in an assembled condition, is supported at least by one surface against the outer guide sleeve, whereby the surface is preferably arranged orthogonally. In relation to the rotational axis of the inner receiving sleeve and which especially preferred lies completely flat in the area of the opening of the outer guide sleeve. In this way, the inner receiving sleeve can be firmly positioned in the opening of the outer guide sleeve and a simple and economical assembly of the bearing device east be obtained.

According to a particularly preferred further development of the present invention, a portion of the inner receiving sleeve extends on both sides beyond the flange, whereby preferably one of these two portions is pushed as for as the flange into the opening of the outer guide sleeve and especially preferably and especially preferred it is completely received by the latter without projecting out of the side of the opening that laces away from the flange.

According to a particularly advantageous embodiment of the present invention, the flange is, at least in one area, in the form of an actuating area, which preferably can be held by a tool in particular a hexagonal spanner, with which the complete inner receiving sleeve can be rotated in the outer guide sleeve in order to vary the position of the securing means arranged in the recess of the inner receiving sleeve in a simple manner in relation to the outer guide sleeve.

According to an especially preferred embodiment of the present invention, the actuating area is formed in such a way that, as from a defined torque acting on the actuating area, this latter becomes elastically deformed, whereupon the tool, with which the inner receiving sleeve can be rotated, slides in a defined manner along the actuating area, thereby reproducing the effect of an adjustment to the inner receiving sleeve at an essentially stable torque. This is especially advantageous where the device is in series production, as in this case a slightly deviating amount of play arises between the structural components and by the elastic deformation of the actuating area continuously limits the torque that can be applied, thereby ensuring a constant adjustment within a construction series in a particularly simple way.

According to an advantageous further development of the present invention, the outer guide sleeve has an area for contact with or for securing to a further structural component, which is preferably in the form of a flat surface.

A typical embodiment of the present invention is described below with reference to the drawings. The drawings show as follows.

Figure 1:
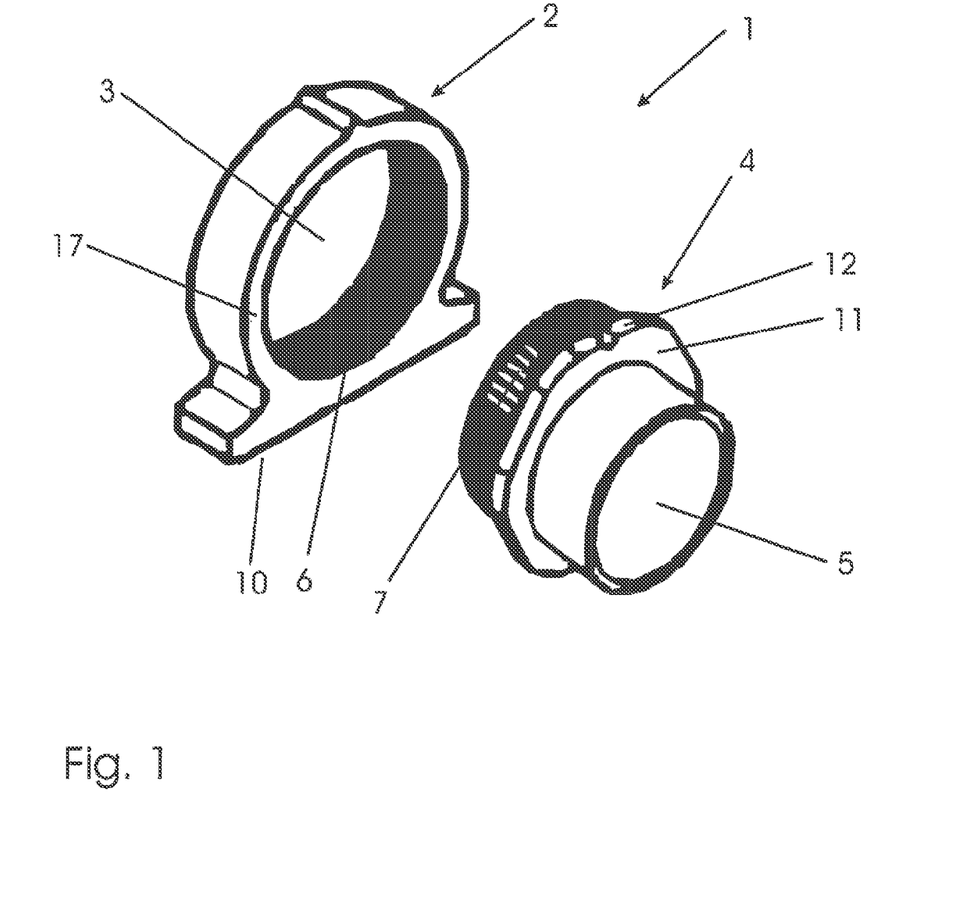
FIG. 1 a perspective view of an embodiment of a bearing unit, comprising an outer guide sleeve and an inner receiving sleeve.

An embodiment of a bearing device 1 of the type depicted in FIG. 1 comprises an outer guide sleeve 2 and an inner receiving sleeve 4, both of which are made completely from a high-strength elastic plastic, such as PE-HD.

Figure 2:
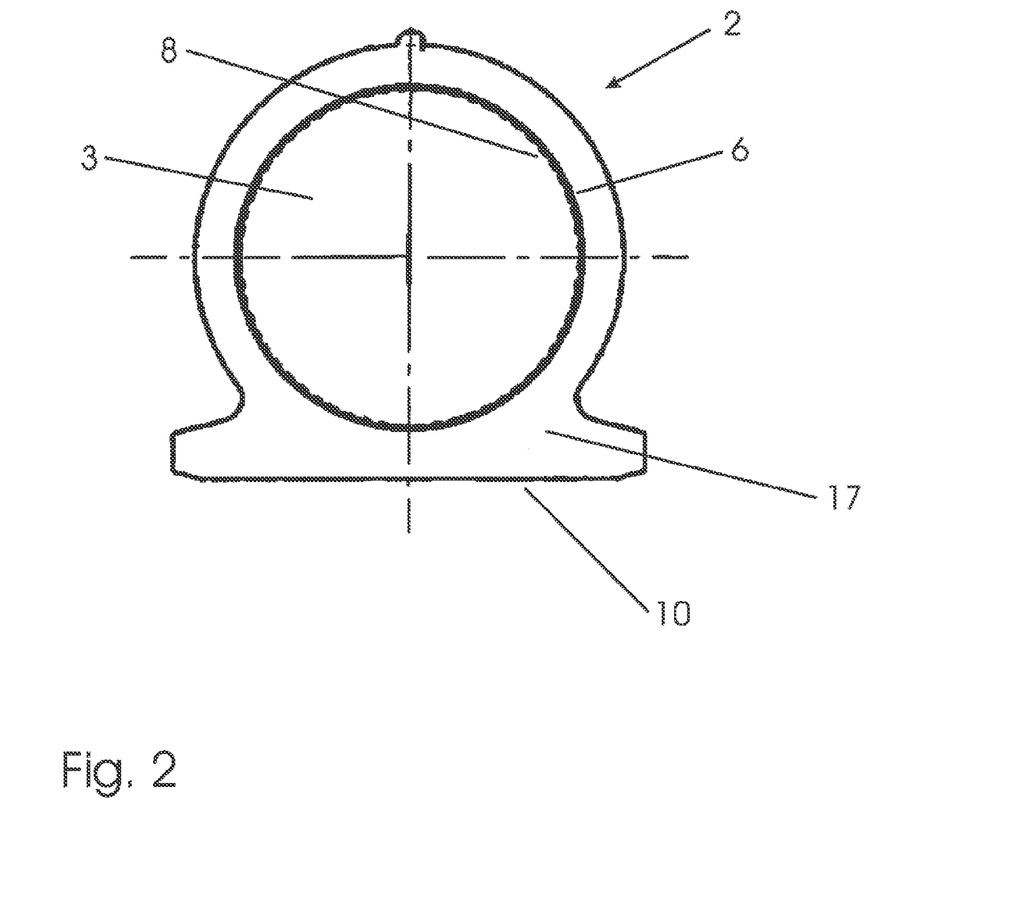
FIG. 2 a schematic view of the outer guide sleeve in the embodiment depicted in FIG. 1.
Figure 3:
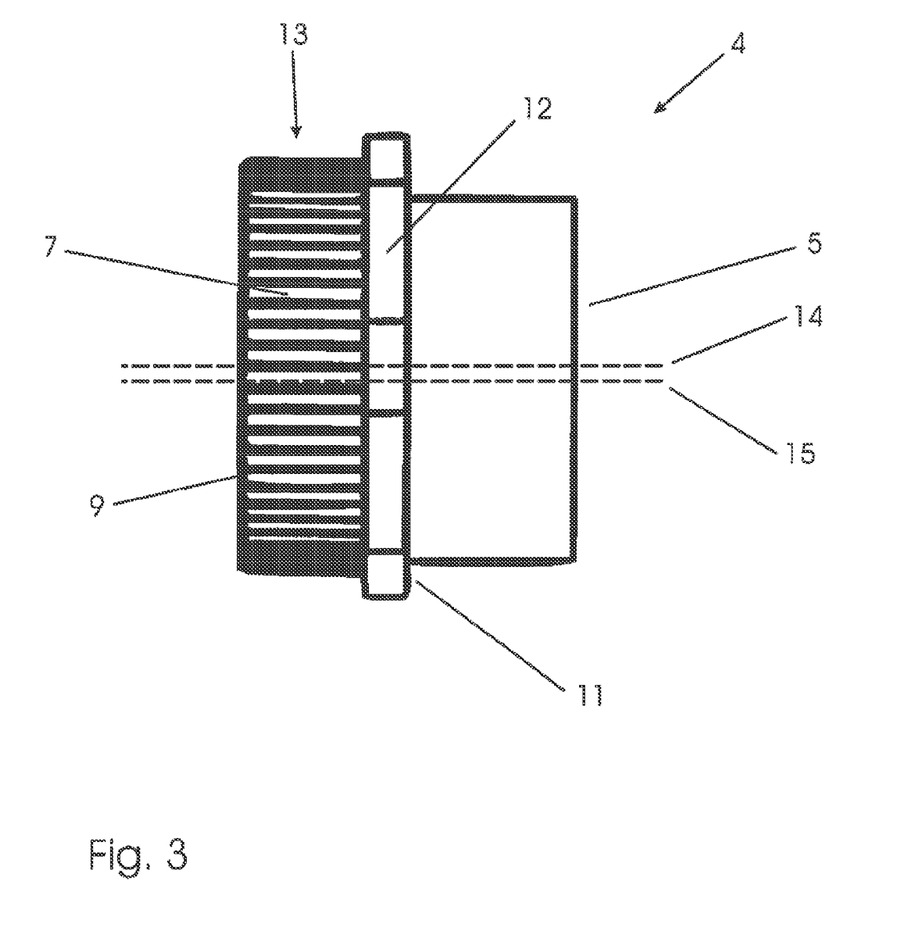
FIG. 3 a schematic view of the inner receiving sleeve in the embodiment depicted in FIG. 1.
Figure 5:
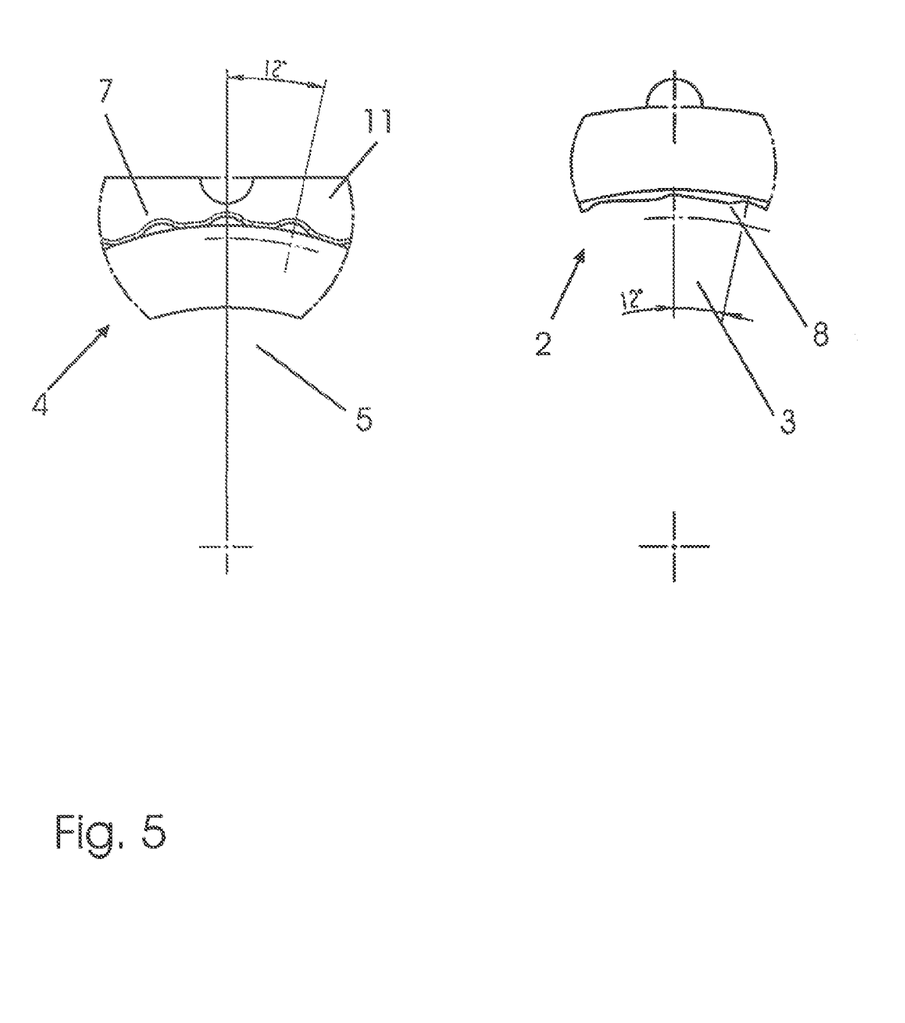

The external guide sleeve 2 has in addition a Circular opening 3 in a flat face end 17 together with a flat area arranged orthogonally in relation to the face end 17, for securing 10 to a further structural component. The convex side wall of the opening 3 forms an outer contact surface 6, which is provided with a toothing arrangement 8 (cf. FIGS. 2 and 5), whereby the said toothing arrangement 8 is asymmetrically shaped in such a way that a preferred direction is obtained, in which the toothing arrangement 8 has a lesser gradient than in the opposite direction.

The inner receiving sleeve 4 comprises a section with an external cylindrically shaped contact area 7, the radius of which is slightly less than the radius of the opening 3 in the outer guide sleeve 2. The outer side of the cylindrically shaped section 13 of the inner receiving sleeve 4 is also provided with a toothing arrangement 9 on its surface (cf. FIG. 5), which is adjusted to the toothing arrangement 8 of the outer guide sleeve 2, whereby the toothing arrangement 8 on the inner receiving sleeve 4 is rounded and symmetrically shaped along both possible directions of rotation.

Figure 4:
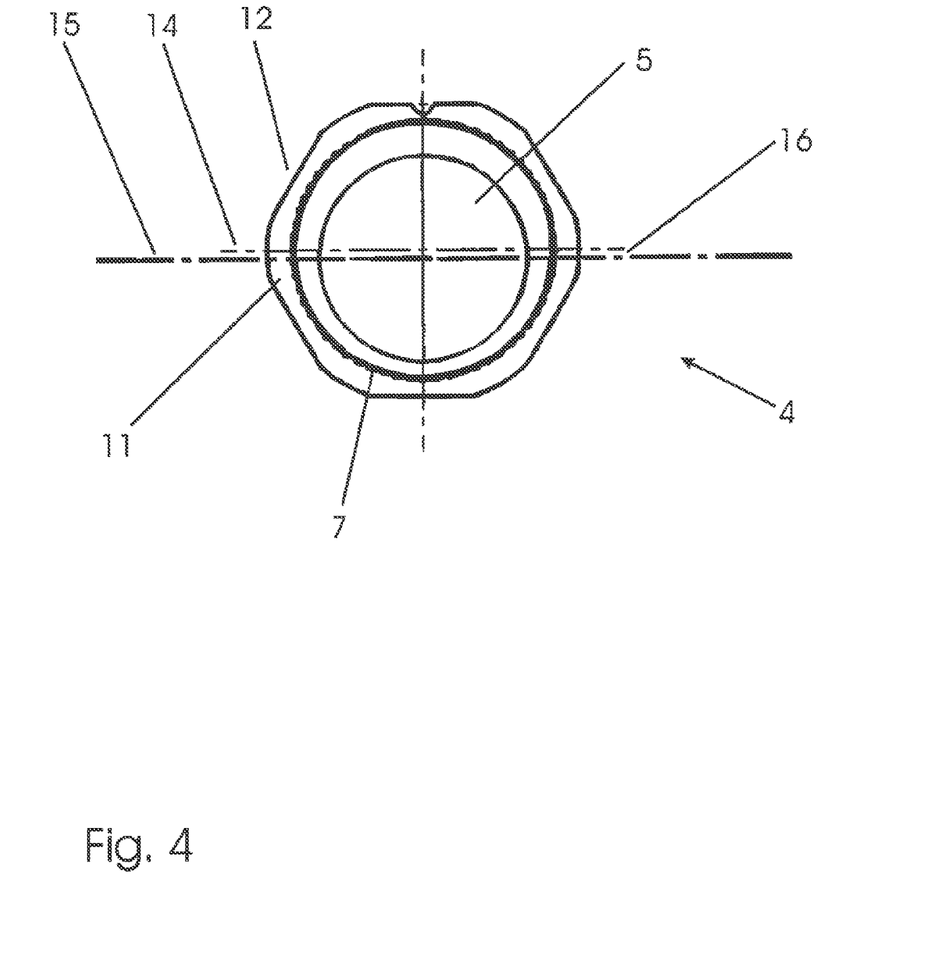
FIG. 4 in contrast to FIG. 3, a view rotated through 90° of the embodiment looking into a recess of the inner receiving sleeve, and FIG. 5 a detailed schematic view of the toothing arrangements of die outer guide sleeve and the inner guide sleeve of the embodiment depicted in FIG. 1.

Adjacent to the cylindrically shaped section 13 on the inner receiving sleeve 4 there is a flange 11 arranged, the outermost edge of which is in the shape of an activity area 12, such that it can be held by means of a hexagonal spanner (FIG. 4). On the side of the flange 11 lying opposite the cylindrical section 13, there extends a further part of the Inner receiving sleeve 4, which comprises a circular recess 5 to accommodate a bolt.

When the bearing device is assembled, the cylindrical section 13 of the inner receiving sleeve 4 is pushed into the opening 3 of the outer guide sleeve 2 until the flange 11 makes contact with the face end 17 of the outer guide sleeve 2. In this way, by means of a hexagonal spanner, the inner receiving sleeve 4 is held at the actuating area 12 of the flange 11 and rotated, whereby the outer toothing arrangement 8 on the contact surface 6 of the opening 3 on the outer guide sleeve 2 and the inner toothing arrangement 9 on the contact surface 7 of the cylindrically shaped section 13 of the inner receiving sleeve 4 are elastically deformed, so that at a given torque the position of the inner receiving sleeve 4 in the opening 2 of the outer guide sleeve 2 is changed by one toothing position of the toothing systems 8, 9 which are in contact.

The rotation of the inner receiving sleeve 4 within the opening 3 of the outer guide sleeve 2 takes place through a rotational axis 14, which passes through the central point of the cylindrically shaped section 13 of the inner receiving sleeve 4 and also through the central point of the opening 3 of the outer guide sleeve 2. This rotational axis 14 is separated by means of an eccentricity 16 from the central axis 15 of the recess 5 of the inner receiving sleeve 4, whereby the central axis 55 passes through the central point of the recess 5 and at the same time in a manner parallel to the rotational axis 14 of the inner receiving sleeve 4.

As a result of this arrangement, by rotating the inner receiving sleeve 4, a bolt arranged in the recess 5 in relation to the outer guide sleeve 2 is not only rotated but changes its position along a circular path. In this way, for example, it is possible to accurately install a rack in relation to a pinion in a vehicle seat, and in particular in a height adjustment device in a motor vehicle seat.

In order to prevent any excessive loading of the bearing device 1 and its associated components during the rotation of the inner receiving sleeve 4 within the opening 3 of the outer guide sleeve 2, the material and the form of the actuating area 12 of the flange 11 on the inner receiving sleeve 4 are chosen in such a way that, if a tool is applied when the predefined torque level is exceeded as a result of an elastic deformation of the material, it will lose its grip. Consequently, a reproducibility of the adjustment through the torque to be applied, which is limited by the deformation of the actuating area 12, is ensured especially in cases where a standard series produced element containing the bearing unit 1 is concerned.

REFERENCE LIST

1 Bearing unit
2 Outer guide sleeve
3 Opening
4 Inner receiving sleeve
5 Recess
6 Outer contact surface
7 inner contact surface
8 Outer toothing
9 inner toothing
10 Area to be secured
11 Flange
12 Actuating area
13 Cylindrically shaped section
14 Rotational axis
15 Central axis
16 Eccentricity
17 Face end

The invention claimed is:

1. A bearing unit comprising:

an outer guide sleeve having an opening; and an inner receiving sleeve, which is arranged in the opening and can be rotated within the opening of the outer guide sleeve, the inner receiving sleeve having a recess, wherein a rotational axis of the inner receiving sleeve in the outer guide sleeve and a central axis of the recess in the inner receiving sleeve are separated by means of an eccentricity, wherein between the outer guide sleeve and the inner receiving sleeve a device is provided for a force and/or form locking system to secure a selected position of the inner receiving sleeve in relation to the outer guide sleeve; and wherein the device provided for the force and/or form locking system is formed from a toothing arrangement, wherein the toothing arrangement is formed from an elastic material which is elastically deformed while the inner receiving sleeve is being rotated in relation to the outer guide sleeve, wherein a specific required moment is present in order to overcome engagement of the toothing arrangement over a friction moment between the inner receiving sleeve and the outer guide sleeve during operation.

2. The bearing unit according to claim 1, wherein the force and/or form locking device for securing the selected position is formed from a device for locking the inner receiving sleeve in relation to the outer guide sleeve, which is preferably arranged on one or more contact surfaces of the inner receiving sleeve and/or the outer guide sleeve in an area of the opening.

3. The bearing unit according to claim 1, wherein the device provided for the force and/or form locking system is formed from a toothing arrangement of the one or more contact surfaces of the inner receiving sleeve and/or the outer guide sleeve.

4. The bearing unit according to claim 1, wherein the recess in the inner receiving sleeve and/or the opening of the outer guide sleeve are essentially round.

5. The bearing unit according to claim 1, wherein the inner receiving sleeve arranged in the opening of the outer guide sleeve projects at one or both of its ends out of the opening of the outer guide sleeve.

6. The bearing unit according to claim 1, wherein the inner receiving sleeve comprises a flange, which in an assembled state of the inner receiving sleeve is supported with one surface at least against the outer guide sleeve, wherein this surface is arranged orthogonally in relation to a rotational axis of the inner receiving sleeve.

7. The bearing unit according to claim 6, wherein one or more parts of the inner receiving sleeve extends on both sides beyond the flange, wherein one of the one or more parts is pushed into the opening of the outer guide sleeve through to the flange.

8. The bearing unit according to claim 7, wherein the one of the one or more parts is completely received by the opening of the outer guide sleeve without projecting from the side of the opening facing away from the flange.

9. The bearing unit according to claim 6, wherein the flange is, at least in one part, in the form of an actuating area, which is held by a tool, wherein the entire inner receiving sleeve can be rotated.

10. The bearing unit according to claim 9, wherein the actuating area is formed in such a way that when a defined torque is applied to the actuating area, the actuating area is elastically deformed.

11. The bearing unit according to claim 9, wherein the tool is a hexagonal spanner.

* * * * *

UNITED STATES PATENT AND TRADEMARK OFFICE
CERTIFICATE OF CORRECTION

| | | |
|---|---|---|
| PATENT NO. | : 9,512,875 B2 | Page 1 of 1 |
| APPLICATION NO. | : 14/410673 | |
| DATED | : December 6, 2016 | |
| INVENTOR(S) | : Norbert Griewenka | |

It is certified that error appears in the above-identified patent and that said Letters Patent is hereby corrected as shown below:

On the Title Page

Item (56)

FOREIGN PATENT DOCUMENTS
DE 8024841 U1, delete "9/1979" insert --3/1981--
DE 19947619 A1, delete "10/1999" insert --4/2001--
DE 102010031724 A1, delete "7/2010" insert --1/2012--

OTHER PUBLICATIONS insert --PCT International Preliminary Report on Patentability dated January 8, 2015 (Application No. PCT/EP2013/059746)--

In the Specification

Column 7, Line 30-31, delete "which is preferably" and insert --which is--

Signed and Sealed this
Eighteenth Day of April, 2017

Michelle K. Lee
*Director of the United States Patent and Trademark Office*